Patented Dec. 26, 1939

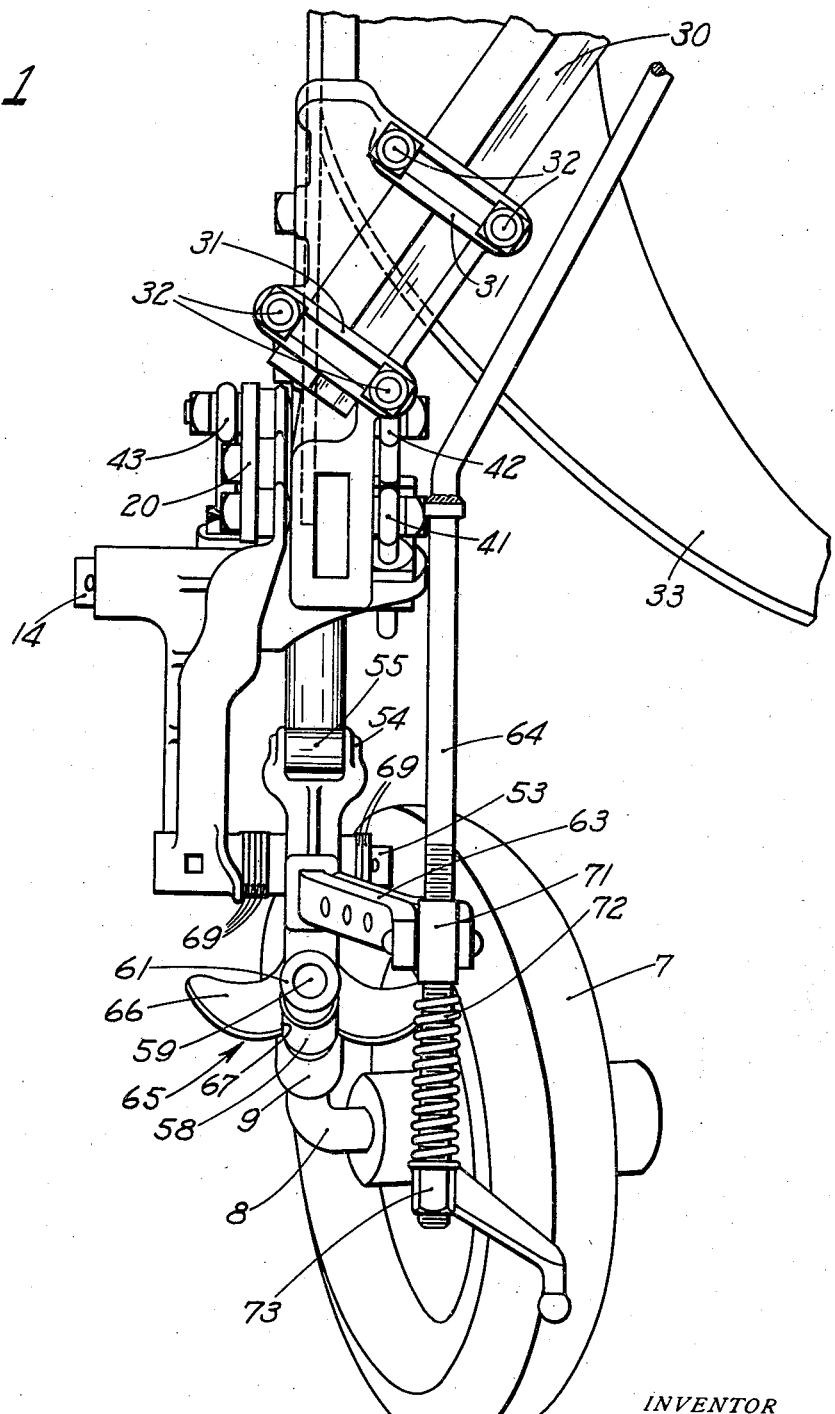

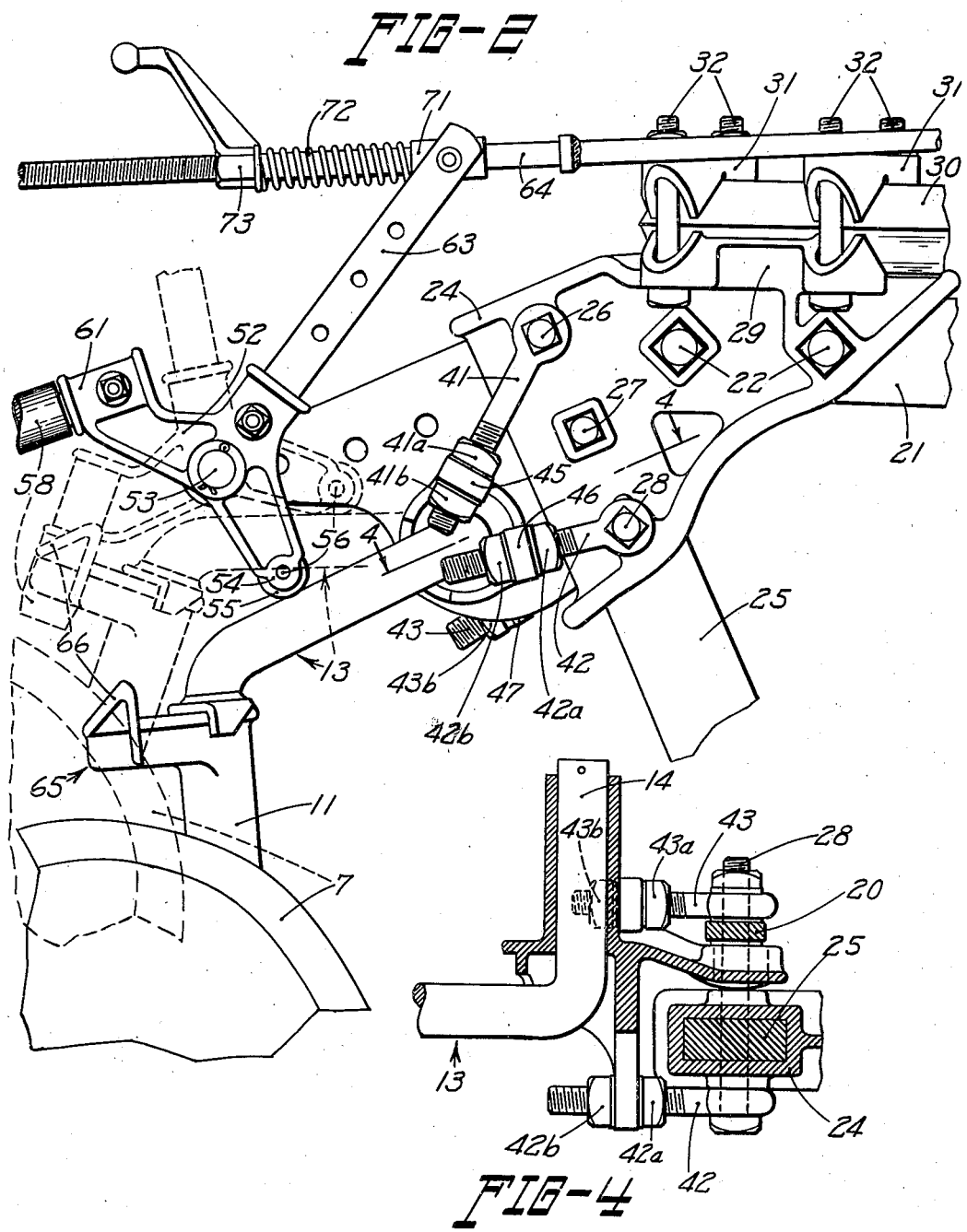

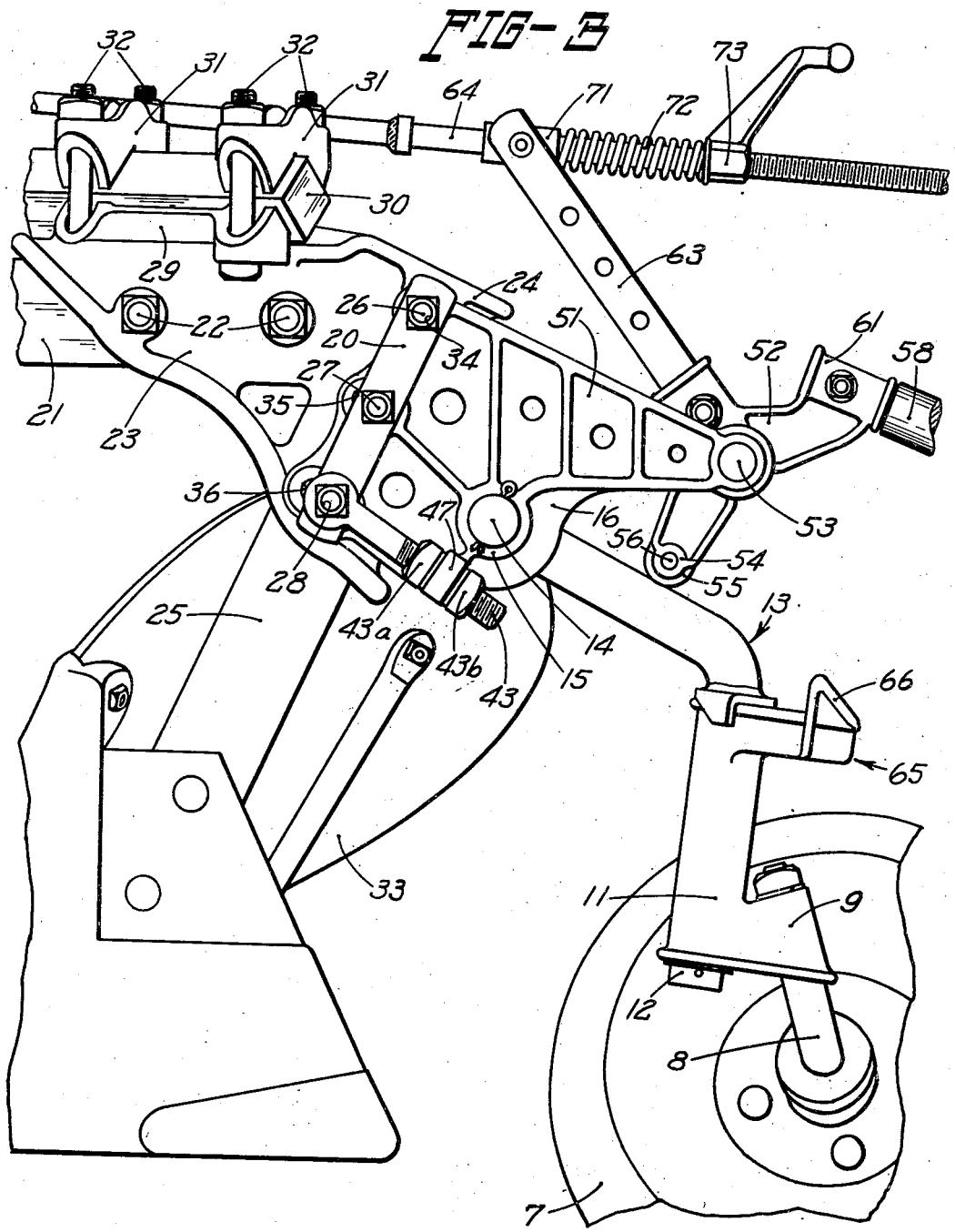

2,184,403

UNITED STATES PATENT OFFICE 2,184,403

PLOW

Carl G. Strandlund, Moline, Ill., assignor to Deere & Company, Moline, Ill., a corporation of Illinois Application August 19, 1937, Serial No. 159,933

21 Claims. (Cl. 97—127)

My present invention relates to the rear furrow wheel structure for plows and particularly to the type shown and described in the Ohlendorff Patent 2,076,666 issued April 13, 1937.

The principal object of the invention is directed to an improved means for vertically and laterally adjusting the rear furrow wheel relative to the rear plow bottom to accommodate the implement to varying soil conditions and to compensate for wear.

A further object is to provide an adjusting means which will be readily accessible for quick and easy adjustment and adapted to securely hold the wheel in the desired position.

Other and further objects will appear from the following detailed description of an embodiment of my invention illustrated in the accompanying drawings, in which Figure 1 is a fragmentary plan view of the rear portion of a plow and disclosing the novel features of my invention, the parts being shown in plowing position;

Figure 2 is a right-hand side elevational view of the portion of the plow shown in Figure 1 and illustrating in full lines the position the parts assume when the plow bottom is raised to transport position, and in dotted lines the position of the parts when the plow bottom is in plowing position;

Figure 3 is a left-hand side elevational view of the structure shown in Figure 2; and Figure 4 is a detail sectional view taken on the plane of line 4—4 of Figure 2.

The structure illustrated comprises a rear furrow wheel 7 which is journaled on a wheel spindle 8 supported in a fixed position in a wheel support 9 which is preferably formed of a casting. The wheel support 9 is provided with a journal bearing portion 11 which is adapted to receive a vertical axle stem 12 provided on the lower end of an axle 13. The axle 13 extends upwardly through the bearing portion 11 and projects forwardly and upwardly beyond the upper end thereof. The front end of the axle 13 is bent laterally to form a bearing portion 14 which is swingably mounted in a bearing 15 formed on a frame member 16. The frame member 16 is adjustably mounted on the rear of the plow for a purpose and in a manner to be later described.

The plow structure used in the present instance is of the built-up type disclosed in my co-pending application, Serial No. 140,332, filed May 3, 1937, and comprises a horizontal beam 21 to the rear end of which is secured by bolts 22, a bracket member 23. A downwardly and forwardly inclined sleeve 24 is formed on the rear end of the bracket member 23. The sleeve 24 is rectangular in cross section and is adapted to receive the upper end of a plow stock 25 fixedly secured in the sleeve 24 by retaining bolts 26, 27 and 28 which extend through aligned holes in the sleeve 24 and plow stock 25.

A socket 29, which forms the lower half of a clamp device, is formed on the upper side of the bracket member 23. The socket 29 is provided with a right angularly shaped recess which is adapted to receive a diagonally disposed frame bar 30. Cap members 31 engage the upper side of the bar 30 and are positioned to receive clamping bolts 32 which extend upwardly from the socket 29. A conventional design of plow bottom 33 is mounted on the lower end of the plow stock 25 in the customary manner.

The frame member 16 is attached to the rear of the plow by means of the bolts 26, 27, and 28 which extend through holes 34, 35, and 36 provided in the frame member 16 and disposed in alignment with the bolts. The lower holes 35 and 36 comprise slots formed on arcs which are concentric with the upper hole 34 to permit adjustment of the member 16 about the bolt 26 to raise or lower the axle 13 to adjust the wheel 7 relative to the plow bottom 33. A three hole cover plate 20 is provided over the holes 34, 35, and 36 which serves as a washer against which the heads of the bolts 26, 27, and 28 are drawn. To positively hold the frame member 16 in the desired position of adjustment, threaded eye bolts 41, 42, and 43 are provided between the plow frame and the member 16. Bolts 41 and 42 are disposed on the right-hand side of the plow and are mounted on the bolts 26 and 28 which pass through the eyes of said eye bolts. The eye bolt 43 is mounted on the left-hand side of the plow and is disposed with its eye engaging over the lower bolt 28. The opposite ends of the eye bolts 41, 42, and 43 extend through apertures provided in lugs 45, 46, and 47, respectively, formed on the frame member 16 in convenient locations to receive the bolts. Lock nuts 41a and 41b, 42a and 42b, and 43a and 43b are threaded on the eye bolts 41, 42, and 43, respectively, against the front and rear sides of the lugs 45, 46, and 47. These lock nuts are normally drawn into locking engagement with the contacting faces of their respective lugs and serve to rigidly secure the frame member 16 to the bracket member 23.

The fastening means above described provides for easy and quick adjustment of the rear furrow wheel 7 relative to the rear plow bottom. To adjust the operating position of the wheel upwardly it is merely necessary to loosen the nuts on bolts 26, 27 and 28, back off lock nuts 42b and 43b away from lugs 46 and 47 to the extent of the desired adjustment, and then advance lock nuts 42a and 43a to again clamp the lugs between the lock nuts. To lower the operating position of the wheel, lock nuts 42a and 43a are backed off and lock nuts 42b and 43b are advanced. The rear furrow wheel 7 can be adjusted laterally by adjusting the nuts on one side of the frame member 16 in one direction and the nuts on the other side of the frame member in the opposite direction. For example, to move the wheel away from the land the nuts 41a, 42a and 43b are backed off the proper distance from the lugs 45, 46 and 47, respectively, and nuts 41b, 42b and 43a are advanced a corresponding amount. To adjust the wheel in the opposite direction the nuts 41b, 42b and 43a are backed away and the nuts 41a, 42a, and 43b are tightened to lock the wheel in the new position.

In Figure 2 of the drawings is illustrated in full lines the position of the parts when the plow bottom 33 is raised into transport position. With this arrangement the rear wheel 7 is free to caster to facilitate turning the implement. When the plow is lowered into plowing position, as is shown in dotted lines in this same figure, the wheel 7 is locked against lateral movement and is arranged in line with the land side of the bottom 33 and bears against the side of the furrow, thereby serving to carry the land side pressure of the plow.

The mechanism employed for locking the rear furrow wheel against castering when the plow is in operating position and for raising the rear end of the plow to inoperative position, is mounted on an arm 51 provided on the rear of the frame member 16. The locking mechanism comprises a swinging arm 52 which is pivotally mounted intermediate its ends on a bearing spindle 53 fixed on the end of the arm 51. One end of the arm 52 is forked at 54 to receive a roller 55 which engages the upper surface of the forwardly inclined portion of the axle 13. The roller 55 is journaled on a horizontal pin 56 which extends through aligned holes in the legs of the fork 54 and the roller 55. A roller 58 is provided at the opposite end of the arm 52 and is journaled on a pin 59 secured in a sleeve 61 formed on the arm 52. A lever 63 is secured to the arm 52 and projects upwardly at right angles thereto and is connected through the usual tension rod 64 with the lifting mechanism (not shown) which is used to raise and lower the plow. The rod 64 extends through a pivot block 71 which is pivotally mounted in the upper end of the arm 63 and projects rearwardly beyond the end thereof. A spring 72 is mounted over the projecting end of the rod 64 between the rear end of the pivot block 71 and an adjusting nut 73, which is threaded on the outer end of the rod 64.

When the plow is lowered into operating position, the arm 52 is rotated in a clockwise direction about its axis 53, as viewed in Figure 3, and the roller 58 is swung downwardly into engagement with a forked locking member 65 provided on the upper end of the bearing portion 11. The locking member 65 is formed of a pair of wings 66 disposed at opposite sides of a central slot or recess 67 which receives the roller 58. When the roller 58 is engaged in the recess 67 the wheel 7 is locked against lateral swinging and is adapted to carry the land side pressure of the plow.

The lead of the rear furrow wheel 7 can be adjusted by means of shims 69 on the bearing spindle 53 on either side of the arm 52, one or more of which can be transposed from one side to the other to shift the arm laterally relative to the furrow wheel. This has no effect on the furrow wheel 7 when the plow is in transport position, but when the plow is lowered, the arm 52 swings the roller 58 down into the slot 67, thereby determining the angular relation between the wheel supporting member 11 and the crank arm 13. When the arm 52 in raised position is offset laterally from the slot 67, it descends into engagement with one of the inclined wings 66, thereby forcing the member 11 to rotate on the vertical spindle 12 into the correct position for plowing.

From the foregoing description it will be apparent that the present mechanism provides a simple and positive means for readily adjusting the operating position of the wheel 7 both vertically and laterally independently, for changing the vertical and lateral position of the wheel with respect to the rear plow bottom as well as to change the lead.

What I claim is:

1. In a plow comprising a plow beam, a rear support for said beam, and means connecting said support to said beam for lateral and vertical adjustment relative thereto comprising three non-parallel bolts disposed in different planes having means for adjusting the effective length thereof.

2. A plow comprising a frame, a supporting wheel, an axle for said wheel, a bracket adjustably mounted on said frame and connected with said axle, and draw bolts pivotally mounted at opposite sides of said frame and engaging said bracket for vertically and laterally adjusting said bracket relative to said frame.

3. In a plow comprising a plow beam, a rear furrow wheel supporting member connected with said plow beam for lateral swinging movement relative thereto, means for locking said member against lateral swinging when the plow beam is in operating position including an arm pivoted on the plow beam and swingable into engagement with said member, and means for adjusting the lateral position of said arm whereby said member may be locked in different positions.

4. In a plow comprising a plow beam, a rear furrow wheel support comprising a supporting member, and means for swingably connecting said support with said beam, means for swinging said member vertically to raise the plow beam and for locking said member against lateral swinging when the plow beam is in operating position including an arm pivoted between its ends on the plow beam and disposed with one end in engagement with said support and the other end swingable into locking engagement with said member, and means for adjusting the lateral position of said arm whereby said supporting member may be locked in different positions.

5. In a plow comprising a plow beam, a rear furrow wheel support comprising a supporting member, a locking fork on said member, and means connecting said member to said plow beam for vertical and lateral swinging movement relative thereto, means for swinging said member vertically to raise the plow beam and for locking said member against lateral swinging when the plow beam is in operating position including an arm pivoted between its ends on the plow beam and disposed with one end in engagement with said support and the other end swingable into locking engagement with said fork, and means for adjusting the lateral position of said arm whereby said supporting member may be locked in different positions.

6. In a plow comprising a plow beam, a rear furrow wheel, a support therefor comprising a supporting member, and means connecting said member to said plow beam for vertical and lateral swinging movement relative to said beam, means for swinging said member vertically to raise the plow beam and for locking said member against lateral swinging when the plow beam is in operating position including a locking member pivoted on the plow beam and engaging said support, and means for adjusting the lateral position of one of said members whereby said furrow wheel may be adjusted laterally in operating position.

7. In a plow comprising a plow beam, a rear furrow wheel support comprising a wheel supporting member, and means connecting said member with said plow beam for vertical and lateral swinging relative to said beam, a lifting member pivotally mounted on said plow beam, means actuated by the swinging movement of said lifting member to one position to cause said support to swing vertically to lift the plow, an arm on said lifting member having a locking member engaging a companion member on said support when said lifting member is in another position, and means for positioning one of said members in different lateral positions on said plow beam whereby said support may be locked in different lateral positions.

8. In a plow comprising a plow beam, a rear furrow wheel support comprising a frame adjustably connected to said beam for angular adjustment both vertically and laterally relative to said beam, a rear wheel supporting member, means connecting said member to said frame for vertical swinging relative thereto, and means for swinging said member to raise the plow beam.

9. In a plow comprising a plow beam, a rear support for said beam, three non-parallel bolts interconnecting said beam and said rear support and disposed in different planes and arranged with two bolts positioned at one side of said beam and one bolt at the other side thereof, said bolts having means for adjusting the effective length thereof to adjust the position of said rear support relative to said plow beam.

10. In a plow comprising a plow beam, a rear support for said beam, means connecting said support to said beam for lateral and vertical adjustment relative thereto comprising a plurality of bolts mouted on said plow beam, cooperating lugs mounted on said support adapted to slidably receive said bolts, and nuts on said bolts engaging the opposite sides of said lugs whereby said support may be locked in different positions.

11. In a plow comprising a plow beam, a rear support for said beam, means connecting said support to said beam for lateral and vertical adjustment relative thereto comprising three bolts pivotally mounted on said plow beam and arranged with two bolts positioned at one side of said beam and one bolt at the other side thereof, cooperating lugs mounted on said support adapted to slidably receive said bolts, and nuts on said bolts engaging the opposite sides of said lugs whereby the effective length of said bolts may be adjusted and locked in different positions.

12. A plow comprising a frame, a supporting wheel, an axle for said wheel, a bracket adjustably mounted on said frame and connected with said axle, and draw bolts pivotally mounted at opposite sides of said frame and engaging said bracket for adjusting said bracket angularly relative to said frame.

13. A plow comprising a frame, a supporting wheel, an axle for said wheel, a bracket adjustably mounted on said frame and connected with said axle, and adjusting bolts connected at opposite sides of said frame and engaging said bracket, said bolts being adapted for adjusting said bracket angularly laterally relative to said frame by adjusting said bolts in opposite directions and for adjusting said bracket angularly vertically relative to said frame by adjusting said bolts in the same direction.

14. In an implement of the class described including a frame, a ground engaging wheel therefor, a supporting bracket for said wheel, and bolts disposed on opposite sides of said bracket, respectively, each bolt being connected between said bracket and said frame, whereby said bracket is adjustably fixed with respect to said frame in different angular positions relative thereto.

15. In an implement of the class described including a frame member, a ground wheel therefor, a bracket member for supporting said wheel, means for pivotally connecting said bracket to said frame member, and a pair of bolts disposed on opposite sides of said bracket member, respectively, swingably connected to said frame member and engaging said bracket member, said bolts being adjustable to adjust said bracket member relative to said frame member.

16. In an implement of the class described including a frame, a ground engaging wheel therefor, a supporting bracket for said wheel, means for pivotally connecting said bracket to said frame providing for vertical swinging movement and a limited amount of lateral swinging movement of said bracket relative to said frame, and a pair of bolts disposed on opposite sides of said bracket, respectively, and connecting the latter with said frame at points on the frame spaced vertically from said pivotal connecting means, whereby said bracket can be adjusted angularly relative to said frame.

17. In a plow including a vertically extending shank, a rear support comprising a ground engaging wheel and a supporting bracket therefor, means comprising a bolt extending transversely through aligned openings in said shank and said bracket for connecting the same together and providing for angular movement of said bracket with respect to said shank, and laterally spaced, generally longitudinally extending adjusting bolts disposed on opposite sides of said shank and interconnecting said bracket and said shank, for adjusting said bracket about the axis of said transverse bolt and for obtaining a limited amount of angular adjustment of said bracket laterally relative to said shank.

18. In a plow including means serving as a frame, a rear support comprising a ground engaging wheel, a member on which said wheel is journaled, and a supporting bracket, said member being swingably connected to said bracket for vertical movement to permit the plow to be raised and lowered relative to said wheel, means connecting said bracket with said frame means providing for a limited angular movement of said bracket relative to said frame, and a plurality of generally longitudinally extending bolts disposed on opposite sides of said bracket and connected between said bracket and said frame, said bolts being adjustable for the purpose of securing said bracket in different positions of angular adjustment relative to said frame.

19. In a plow including a beam, a rear support comprising a ground engaging wheel, a member on which said wheel is journaled, a supporting bracket, said member being connected to said bracket for vertical swinging movement relative thereto, means connecting said bracket to said beam providing a limited amount of movement relative thereto, and at least two adjusting bolts disposed one on each side of said bracket, one end of each bolt being connected to said beam and the opposite end to said bracket whereby adjustments of the effective lengths of said bolts effects adjustment of said bracket relative to said beam.

20. In a plow including a beam, a rear support comprising a ground engaging wheel, a member on which said wheel is journaled, a supporting bracket, said member being connected to said bracket for vertical swinging movement relative thereto, means connecting said bracket to said beam providing a limited amount of movement relative thereto, at least two adjusting bolts disposed one on each side of said bracket, one end of each bolt being connected to said beam and the opposite end to said bracket whereby adjustments of the effective lengths of said bolts effects adjustment of said bracket relative to said beam, and actuating mechanism supported on said bracket for swinging said member relative to said bracket to raise and lower the plow.

21. In an implement of the class described comprising a frame member, a ground engaging support, and means connecting said support to said frame member providing adjustment of said support relative to said frame member, said connecting means including a plurality of bolts mounted on said frame member, cooperating lugs mounted on said support adapted to slidably receive said bolts, and nuts on said bolts engaging said lugs, whereby adjustment of said bolts effects adjustment of said support relative to said frame member.

CARL G. STRANDLUND.